C. S. ERGENBRIGHT.
TRAP.
APPLICATION FILED APR. 26, 1915.
1,176,670.
Patented Mar. 21, 1916.
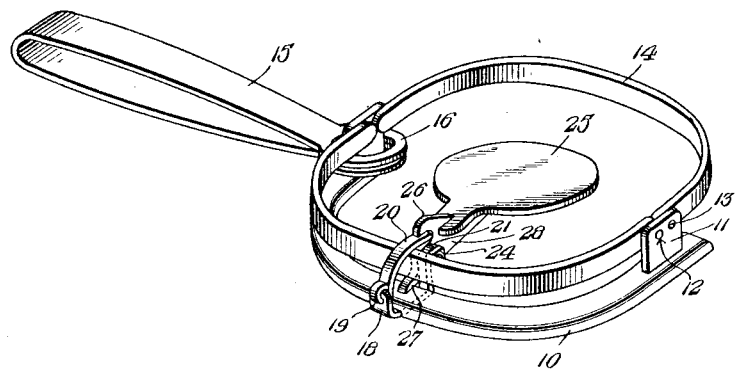
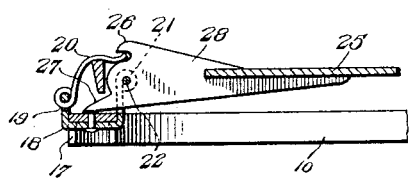
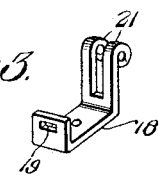
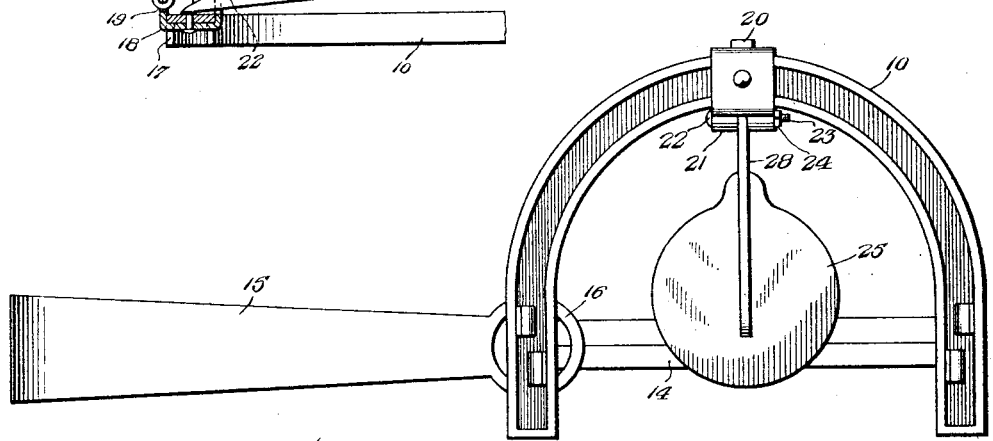
Witnesses
J. H. Crawford
Inventor
Charles S. Ergenbright,
By Victor J. Evans
Attorney

UNITED STATES PATENT OFFICE.

CHARLES S. ERGENBRIGHT, OF ARROWROCK, IDAHO.

TRAP.

1,176,670.　　　　Specification of Letters Patent.　　Patented Mar. 21, 1916.

Application filed April 26, 1915.　Serial No. 23,982.

*To all whom it may concern:*

Be it known that I, CHARLES S. ERGENBRIGHT, a citizen of the United States, residing at Arrowrock, in the county of Boise and State of Idaho, have invented new and useful Improvements in Traps, of which the following is a specification.

An object of the invention is to provide a trap for use in catching wild animals.

The invention comprehends, among other features, the provision of a trap which is adapted to usually trap the animal by the leg when the animal steps upon the releasing pan of the trap, and to this end the structure is so arranged that a positive engagement with the releasing pan must be effected before the trap will be sprung, thus preventing accidental operation of the trap in the event that the animal should come in contact merely with the jaws when the trap is set.

Still further objects of the invention reside in a structure that consists of few parts, can be cheaply manufactured and will effectually accomplish the purpose for which it is intended.

In the further disclosure of the invention reference is to be had to the accompanying drawings, constituting a part of this specification, in which similar characters of reference denote corresponding parts in all the views, and in which:

Figure 1 is a perspective view of the trap showing the same set; Fig. 2 is a vertical sectional view taken through the releasing pan and its mounting; Fig. 3 is an enlarged fragmentary vertical transverse sectional view taken through the mounting of the releasing pan; and Fig. 4 is a fragmentary bottom plan view.

Referring more particularly to the views, I disclose a substantially U-shaped base 10 having upstanding bearing lugs 11 provided with openings 12 through which pass the lateral ends 13 of jaws 14 to swingingly support the jaws, and which are substantially similar in construction and shape and are adapted to be relatively spread apart as shown. A spring-like V-shaped handle 15 is provided, said handle terminating in enlarged eyes 16, one of which encircles one of the bearing lugs 11 and the other of which is adapted to bear against edges of the jaws 14 and force the jaws together, said latter eye, however being also adapted to encircle one of the bearing lugs when the jaws are in open position but always tending to exert an upward pressure on the jaws to swing the jaws together when one of the jaws is released. The handle 15 in view of its connection with the body of the trap can be swung into a position to lie within the base so that the trap will form a compact package and can be conveniently carried about from one place to another, the handle when in open position as shown in Fig. 1 constituting the means for holding the trap and also the means for actuating the jaws.

At the medial portion of the base and secured in a recess 17 in the under side thereof is a plate 18 having its ends projecting upwardly beyond the base, with one end formed with an opening 19 through which passes the inner end of a pawl 20, the other end of said plate 18 being bifurcated to provide a plurality of horizontally disposed bearings 21 which are slightly spaced apart and through which pass a pin 22 adapted to receive on an end 23 thereof a suitable nut 24. The exposed portion of the pin between the bearings 21 supports the releasing pan 25 and which, at its inner end, is formed with a plurality of projections 26, 27, the former of which is adapted to be engaged by and receive the pawl 21 and the latter of which is adapted to limit the upward swinging movement of the releasing pan by engaging the base, the latter also being adapted to be engaged by one of the jaws when the trap is set so as to swing the releasing pan upwardly in order to permit of receiving the free end of the pawl beneath the projection 26.

Now it will be seen that when it is desired to set the trap a downward pressure is exerted upon the upper portion of the handle so as to move the upper eyelet thereof downwardly in position to encircle one of the bearing lugs, thus releasing the jaws so that they can swing apart and lie in a horizontal plane, with one of the jaws extending between the releasing pan and the pawl and the pawl adapted to bridge one of the jaws and engaged with the projection 26, thus holding this jaw against upward movement due to the action of the spring like handle. Now inasmuch as it is essential that the releasing pan be adjusted so that it will require a greater or less pressure in order to release the pawl so as to cause the trap to be sprung it will be seen that the screwing up of the nut 24 will cause the bearings 21 to move slightly toward each other and have their inner ends bear against the plate-like portion 28 of the releasing pan and which has the projections 26 and 27 formed therewith, thus resulting in a frictional engagement of the releasing pan with the bearings so that the relasing pan will not swing freely but must receive an increased pressure in order to swing it upon the pin 22. With this construction it will be seen that the releasing pan can be arranged to swing rapidly and in fact gravitate into a lowered position or can be secured so that it must receive an increased pressure before it will swing upon the pin, and it will be clearly apparent that this is a feasible arrangement and permits of adjusting the trap to the kind and character of animal that it is desired to catch so that if the trap is set to catch a heavy animal it will not be sprung when an animal of a light weight, such as a rodent, accidentally comes in contact with the releasing pan of the trap. It will also be clearly seen that even if the animal comes in contact with one or both of the jaws the trap will not be operated but the animal must step upon the releasing pan or come in contact with the releasing pan sufficiently to release the same and release the pawl so that it will spring away from its position and be unlocked with respect to the releasing pan so as to permit of the upward and closing movement of the jaws, due to the action of the spring-like handle.

Having thus described my invention, I claim:

In combination, a substantially U-shaped horizontally disposed base, lugs rising from the extremities thereof, jaws mounted between said lugs for swinging movement, means for actuating said jaws to normally close the same, said base being substantially rectangular in cross sectional configuration and being centrally slotted, a substantially U-shaped member arranged within the slot and having a relatively long and short limb embracing the opposite edges of the base and projecting thereabove, said long limb being bifurcated to provide separate portions, the latter terminating to provide alined bearings, a pin passing through said bearings, a releasing pan pivoted upon said pin and arranged between the said bearings for swinging movement, said short limb having an elongated slot, a pawl loosely mounted within said slot and having its free end engaging said pan to lock the jaws in opened position, and means for adjusting the bearings relatively to said pan to regulate the sensitiveness of the latter.

In testimony whereof I affix my signature in presence of two witnesses.

CHARLES S. ERGENBRIGHT.

Witnesses:
L. G. EVANS,
E. L. BALLARD.